United States Patent
Akizuki et al.

(10) Patent No.: US 9,657,818 B2
(45) Date of Patent: May 23, 2017

(54) SWASH PLATE AND PRODUCTION METHOD OF THE SAME

(71) Applicants: Masanori Akizuki, Toyota (JP); Shingo Gotou, Toyota (JP); Hiroshi Kanemitsu, Toyota (JP)

(72) Inventors: Masanori Akizuki, Toyota (JP); Shingo Gotou, Toyota (JP); Hiroshi Kanemitsu, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 513 days.

(21) Appl. No.: 14/227,446

(22) Filed: Mar. 27, 2014

(65) Prior Publication Data

US 2014/0212585 A1 Jul. 31, 2014

Related U.S. Application Data

(62) Division of application No. 12/734,179, filed as application No. PCT/JP2009/068369 on Oct. 27, 2009, now Pat. No. 8,939,644.

(30) Foreign Application Priority Data

Dec. 25, 2008 (JP) .................................. 2008-330203

(51) Int. Cl.
  *F04B 27/08* (2006.01)
  *F16H 23/00* (2006.01)
  (Continued)

(52) U.S. Cl.
  CPC .............. *F16H 23/00* (2013.01); *B05D 1/38* (2013.01); *F04B 27/086* (2013.01);
  (Continued)

(58) Field of Classification Search
  CPC ....... F16H 23/00; B05D 1/38; F04B 27/0886; F04B 27/086; F04B 27/1036;
  (Continued)

(56) References Cited

U.S. PATENT DOCUMENTS 5,620,262 A 4/1997 Kumada et al.
5,817,397 A 10/1998 Kamiya et al.
(Continued)

FOREIGN PATENT DOCUMENTS

JP 2 543 423 11/1991
JP 3 009 766 4/1993
(Continued)

OTHER PUBLICATIONS

Form PCT/ISA/210 dated Dec. 15, 2009 (2 pages).
Form PCT/ISA/220 dated Dec. 15, 2009 (4 pages).
Form PCT/ISA/237 dated Dec. 15, 2009 (4 pages).

*Primary Examiner* — Richard Chang
(74) *Attorney, Agent, or Firm* — Flynn, Thiel, Boutell & Tanis, P.C.

(57) ABSTRACT

A swash plate 3 includes a substrate 11 made of an iron-based material, a hard first resin layer 12 provided to coat an end surface of the substrate 11, and a soft second resin layer 13 provided to coat the first resin layer 12. A spiral annular groove 12A is formed in a surface of the first resin layer 12, and the second resin layer 13 is provided to match the sectional shape of the first resin layer 12. With the soft second resin layer 13 on a sliding surface 3A of the swash plate 3, a swash plate 3 having a good fit in an initial stage of sliding can be provided. When the second resin layer 13 partially wears, a protrusion 12 of the first resin layer 12 of the hard resin is exposed to provide good wear resistance and good sliding properties.

6 Claims, 2 Drawing Sheets

(51) Int. Cl.
*F04B 27/10* (2006.01)
*B05D 1/38* (2006.01)

(52) U.S. Cl.
CPC ...... *F04B 27/0886* (2013.01); *F04B 27/1036* (2013.01); *F05C 2201/021* (2013.01); *F05C 2201/0436* (2013.01); *F05C 2201/0475* (2013.01); *Y10T 74/18336* (2015.01)

(58) Field of Classification Search
CPC ......... Y10T 74/18336; F05C 2201/021; F05C 2201/0475; F05C 2201/0436
See application file for complete search history.

(56) References Cited

U.S. PATENT DOCUMENTS

| | | | |
|---|---|---|---|
| 6,123,009 A * | 9/2000 | Kanayama | C23C 28/00 91/499 |
| 6,192,784 B1 | 2/2001 | Kato et al. | |
| 6,491,437 B1 | 12/2002 | Yamada et al. | |
| 6,497,513 B2 | 12/2002 | Yamada et al. | |
| 6,609,830 B2 | 8/2003 | Bank et al. | |
| 6,802,649 B2 * | 10/2004 | Kawagoe | F16C 33/14 384/276 |
| 6,921,205 B2 * | 7/2005 | Kanayama | F04B 27/0873 384/13 |
| 6,983,681 B2 | 1/2006 | Iwata et al. | |
| 7,156,014 B2 * | 1/2007 | Sugioka | C08L 79/08 92/155 |
| 7,255,933 B2 | 8/2007 | Sato et al. | |
| 9,272,308 B2 * | 3/2016 | Yashiki | G02B 5/1842 |
| 2008/0190284 A1 | 8/2008 | Sugioka et al. | |

FOREIGN PATENT DOCUMENTS

| | | |
|---|---|---|
| JP | 2 974 044 | 10/1995 |
| JP | 7 259 863 | 10/1995 |
| JP | 9 071 899 | 3/1997 |
| JP | 2002-039186 | 2/2002 |
| JP | 2007-204602 | 8/2007 |
| JP | 2008-185124 | 8/2008 |
| WO | WO 02/075172 A1 | 9/2002 |

* cited by examiner

|  | COMPARATIVE MEMBER 1 (Cu ALLOY SPRAY COATING) | COMPARATIVE MEMBER 2 (PTFE RESIN) | COMPARATIVE MEMBER 3 (MoS2 RESIN) | COMPARATIVE MEMBER 4 (MIXED RESIN) | THIS EMBODIMENT |
|---|---|---|---|---|---|
| WEAR RESISTANCE | EVALUATION WAS IMPOSSIBLE DUE TO SEIZURE | ○ | × | △ | ○ |
| SEIZURE RESISTANCE | × | △ | ○ | △ | ◎ |
| OIL HOLDING PROPERTIES | △ | × | ○ | △ | ◎ |
| LOW FRICTION | × | × | ○ | △ | ◎ |

SWASH PLATE AND PRODUCTION METHOD OF THE SAME

This is a divisional of prior U.S. application Ser. No. 12/734,179, which was the national stage of International Application No. PCT/JP2009/068369, filed Oct. 27, 2009.

TECHNICAL FIELD

The present invention relates to a swash plate and a production method thereof, and more particularly to a swash plate for a swash plate type compressor mounted in an automobile and a production method thereof.

BACKGROUND ART

A conventionally known swash plate type compressor includes a swash plate rotated by a rotating shaft, a plurality of shoes that slide with respect to the swash plate, and a plurality of pistons that slide with respect to the plurality of shoes and reciprocate (for example, Patent document 1).

For such a conventional swash plate type compressor, to improve the sliding properties between the shoe and the swash plate, it has been proposed that, for example, an end of the shoe is formed to have a convex shape with a high middle side or a sliding surface of the swash plate is improved (Patent documents 2 and 3). Also, to improve the sliding properties, proposals have been made on an improvement in a sliding surface of a bearing as a sliding member or in a material (for example, Patent documents 4 to 6).

PRIOR ART DOCUMENTS

Patent Documents

Patent document 1: Japanese Patent Laid-Open No. 2008-185124

Patent document 2: National Re-publication of International Patent Application No. WO2002-075172

Patent document 3: Japanese Patent Laid-Open No. 9-71899

Patent document 4: Japanese Patent Laid-Open No. 7-259863

Patent document 5: Japanese Patent Laid-Open No. 2002-39186

Patent document 6: Japanese Patent Laid-Open No. 2007-204602

SUMMARY OF THE INVENTION

Technical Problem

Clutchless swash plate type compressors have been recently widely used. In such a clutchless swash plate type compressor, a swash plate is always rotated in an operation state of an engine of an automobile. In this case, a variable capacity swash plate type compressor is a precondition, and when a car air conditioner is not used, the swash plate is maintained perpendicularly to a rotating shaft. In this state, a piston of the swash plate type compressor does not reciprocate, and thus a coolant and mist-like lubricating oil are not circulated in a cylinder of the swash plate compressor. Specifically, since the coolant and the mist-like lubricating oil are not circulated in the swash plate type compressor, an insufficient amount of lubricating oil is supplied to a sliding portion between the swash plate and the shoe to cause poor lubrication. Further, the coolant itself washes the lubricating oil, and the sliding portion between the swash plate and the shoe easily falls under a boundary lubrication condition due to a dry sliding condition. Thus, the clutchless swash plate type compressor has disadvantages in that the frictional heat in sliding between the shoe and the swash plate increases the wear of a resin layer that forms a sliding surface of the swash plate, or seizure of the resin layer of the swash plate occurs.

Also, for a swash plate with a sliding surface coated with a resin layer, wear of the resin layer causes a plated layer or a metal layer as an intermediate layer to be exposed and easily causes seizure.

It may be conceivable to use, as a swash plate, a sliding member disclosed in Patent Literature 4, that is, a sliding member including a metal material placed on a surface of a substrate and having an annular groove in a surface. However, the sliding member in Patent document 4 is a plain bearing of a crankshaft, and for the plain bearing, sufficient lubricating oil is forcedly supplied to a sliding surface. Thus, the sliding member in Patent Literature 4 can obtain sufficient sliding properties as the plain bearing. However, if the sliding member in Patent Literature 4 is used as a swash plate in the poor lubrication state as described above, the metal swash plate comes into contact with the metal shoe to easily cause seizure on the sliding surface.

Solution to Problem

In view of the above-described circumstances, the present invention provides a swash plate having a sliding surface that slides with respect to a shoe, including: a substrate made of any of iron-, aluminum-, or copper-based materials; a hard first resin layer provided to coat a surface of the substrate and having an annular groove formed in an outer side surface; and a soft second resin layer provided to coat the surface of the first resin layer and formed to match a sectional shape of the annular groove in the first resin layer, wherein in an initial stage of sliding with respect to the shoe, the second resin layer is the sliding surface, and when the second resin layer partially wears and a protrusion of the annular groove in the first resin layer is exposed, the protrusion and the second resin layer adjacent to the protrusion are the sliding surface.

The present invention provides a production method of a swash plate, including the steps of: applying a resin paint for a first resin layer composed of a hard resin to an end surface of a substrate to provide the first resin layer; drying and/or baking the first resin layer and then forming a minute annular groove in a surface of the first resin layer; applying a resin paint for a second resin layer composed of a soft resin to the first resin layer provided with the annular groove; then rotating the substrate at high speeds to remove unnecessary parts of the resin paint for the second resin layer; and forming the second resin layer to match the sectional shape of the surface of the first resin layer.

Effects of Invention

According to the above-described configuration, the soft second resin layer is the sliding surface in the initial stage of sliding, thereby providing a swash plate having a good fit to the shoe. After sliding with respect to the shoe, the hard first resin layer is exposed as the sliding surface and slides with respect to the shoe, thereby providing a swash plate having a good wear resistance.

DESCRIPTION OF THE EMBODIMENTS

Figure 1:
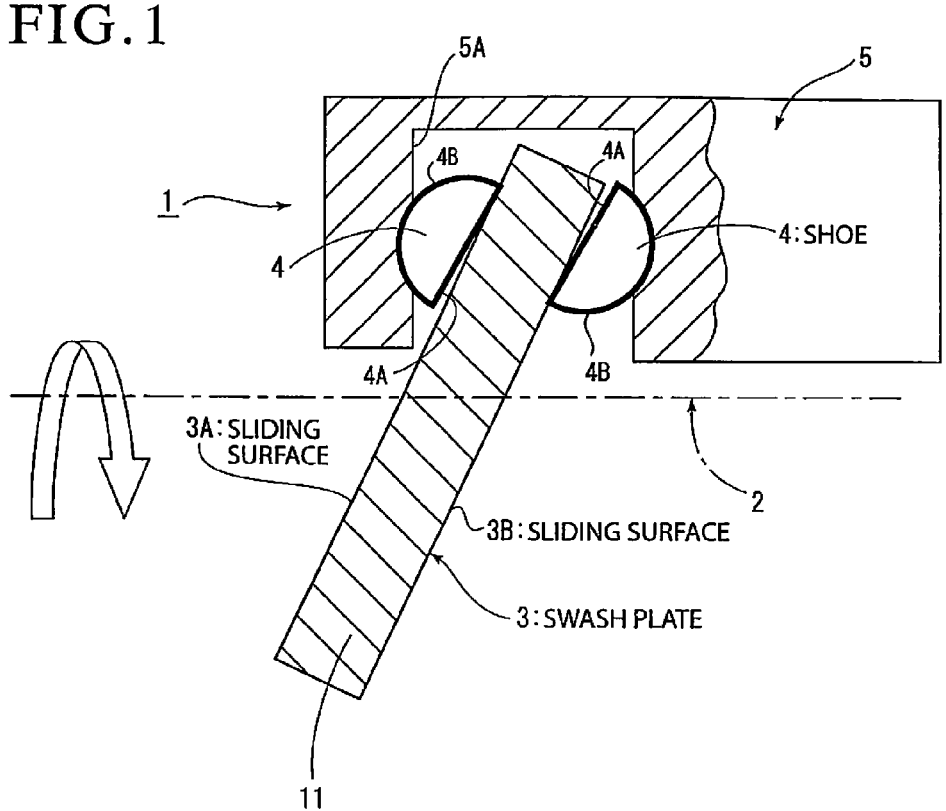
FIG. 1 is a sectional view of the essential portions of an embodiment of the present invention.

Now, the present invention will be described based on a shown embodiment. In FIG. 1, reference numeral 1 denotes a sliding device provided in a housing of a variable capacity swash plate type compressor. The sliding device 1 includes a swash plate 3 mounted to a rotating shaft 2 journaled in the housing, and a plurality of shoes 4 that slide with respect to the swash plate 3.

The swash plate 3 is formed into a disk shape, and opposite end surfaces of the swash plate 3 are sliding surfaces 3A and 3B that slide with respect to the shoes 4. The swash plate 3 is adjusted in inclination angle with respect to the rotating shaft 2 by an unshown inclination angle adjustment means. Meanwhile, the shoe 4 is generally made of a semi-spherical metal and has a flat sliding surface 4A that slides with respect to the sliding surface 3A or 3B of the swash plate 3 and a semi-spherical surface 4B.

In the housing of the swash plate type compressor, a plurality of pistons 5 are provided in parallel with and surround the rotating shaft 2. A pair of shoes 4 are slidably held in a notch 5A formed in one end of each piston 5, the notch 5A in that state is placed to cover an outer peripheral portion of the swash plate 3 and sliding surfaces 4A of each pair of shoes 4 are abutted against the sliding surfaces 3A and 3B of the swash plate 3. The other end of each piston 5 is slidably fitted in an unshown cylinder provided in the housing.

When the rotating shaft 2 is rotated, the swash plate 3 is rotated, and the sliding surfaces 3A and 3B that are opposite end surfaces of the swash plate 3 slide with respect to the sliding surfaces 4A of each pair of shoes 4, which moves each piston 5 forward and backward in the cylinder via each pair of shoes 4. The above-described configuration is the same as that of a conventionally known sliding device.

Thus, in this embodiment, the sliding surfaces 3A and 3B that are opposite end surfaces of the swash plate 3 are improved as described below to improve the sliding properties of the swash plate 3.

Figure 2:
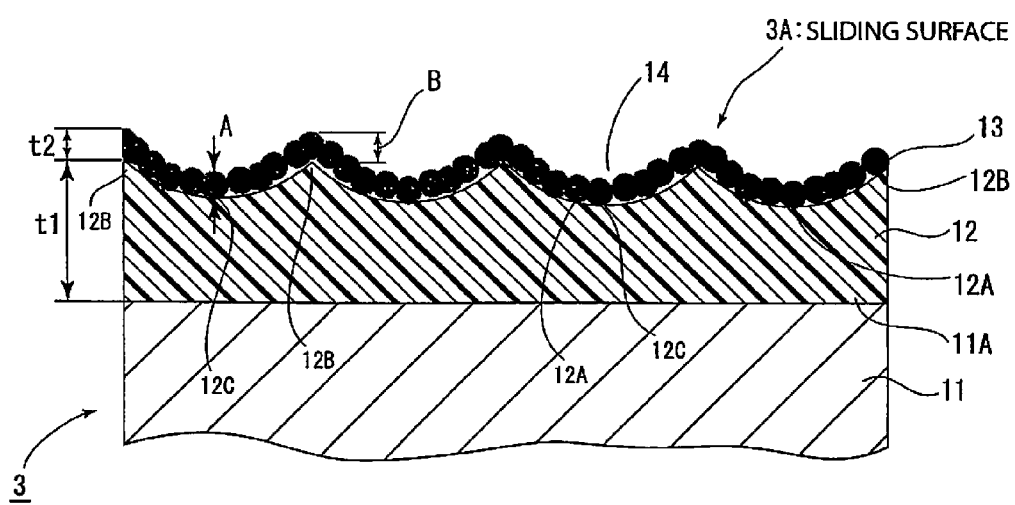
FIG. 2 is an enlarged sectional view of the essential portions of a swash plate 3 shown in FIG. 1.

Specifically, as shown in a sectional view of the essential portions in FIG. 2, the swash plate 3 of this embodiment has a disk-shaped iron-based substrate 11 with a flat surface, and a first resin layer 12 of a hard resin is provided to coat the entire surface of one end surface 11A of the substrate 11.

In this embodiment, as a material for the first resin layer 12, a material is used composed of a thermosetting resin binder to which at least one of graphite, carbon, MoS2 and PTFE is added. Adding a hard material such as alumina besides any of the above-described additives can further increase the strength of the first resin layer 12.

The thermosetting resin binder can include, for example, a polyimide resin (PI), a polyamide-imide resin (PAI), an epoxy resin, a phenol resin, a polyamide (nylon), and an elastomer. Specifically, a thermosetting resin binder such as a varnish of an aromatic polyimide, polyether imide, polyester imide or aromatic polyamide-imide, or diisocyanate-, BPDA-, sulfone-modified resin thereof are preferably used.

The graphite and carbon preferably have a high crystallinity. Particularly, a preferable spacing is 3.5 angstroms or less, which reduces the variations in friction coefficient in sliding. The graphite and carbon may be natural or artificial ones, but the artificial graphite and carbon are preferable in terms of wear resistance, and the natural graphite and carbon are preferable in terms of seizure resistance and low friction. An average particle diameter of the graphite and carbon is not particularly limited, but graphite and carbon having an average particle diameter of 10 μm or more are used to further improve the wear resistance when a load is applied. Meanwhile, graphite and carbon having an average particle diameter of less than 10 μm are preferably used to finely disperse the graphite and carbon in the thermosetting resin binder to provide good wear properties to the binder and further reduce variations in the friction coefficient. Thus, graphite and carbon having the average particle diameter of 10 μm or more and graphite and carbon having the average particle diameter of less than 10 μm are preferably used at an appropriate ratio in combination.

Particularly preferable, the PTFE is a granular baked PTFE. The baked PTFE is prepared by heating (baking) PTFE powder obtained by suspension polymerization or emulsion polymerization to a melting temperature and then grinding the powder, or prepared by compressing and shaping the powder before baking and grinding the powder after the baking. A particularly preferable PTFE is obtained by once shaping powder obtained by suspension polymerization and then baking and grinding the powder. Such baked powder can be used to obtain a relatively hard PTFE, good low friction properties, and also good wear resistance.

The baked PTFE is granular and an average particle diameter thereof is not particularly limited, but PTFE having an average particle diameter of 7 μm or more is used to achieve better low friction properties and also better wear resistance. Meanwhile, PTFE having an average particle diameter of less than 7 μm is preferably used to finely disperse the PTFE in the thermosetting resin binder to provide good friction properties to the thermosetting resin binder. Thus, the PTFE having the average particle diameter of 7 μm or more and the PTFE having the average particle diameter of less than 7 μm are preferably used at an appropriate ratio in combination.

The first resin layer 12 preferably has a component composition of 10% to 50% by mass of graphite, the balance being the thermosetting resin binder, and $MoS_2$ or PTFE may be added as required within a range of 1% to 30% by mass. The amount of PTFE is smaller than that of $MoS_2$ and the total amount of PTFE and $MoS_2$ is smaller than that of graphite.

A spiral annular groove 12A is formed across the entire surface of the first resin layer 12 in a circumferential direction at radially regular pitches. The height of a protrusion 12B of the annular groove 12A, that is, the depth of a recess 12C of the annular groove 12A, is the same across the entire surface of the first resin layer 12.

Further, a second resin layer 13 is provided to coat the entire surface of the first resin layer 12 formed with the annular groove 12A. As a material for the second resin layer 13 of a soft resin, a thermosetting resin binder is used to which at least one of low friction materials such as $MoS_2$ or PTFE is added.

The second resin layer 13 has a component composition of 30% to 80% by mass of $MoS_2$, the balance being the thermosetting resin binder, and PTFE may be added as required within a range of 1% to 30% by mass. The amount of PTFE added is smaller than that of $MoS_2$.

Since the second resin layer 13 is provided to match the sectional shape of the surface of the first resin layer 12, a spiral annular groove 14 matching the surface shape of the first resin layer 12 is maintained in a surface that forms the sliding surface 3A. The swash plate 3 is produced via a production process described later and, thus, extremely minute countless irregularities are formed in the entire surface of the second resin layer 13. This can improve the holding properties of lubricating oil in the surface of the second resin layer 13, that is, the sliding surface 3A.

The thickness t1 of the first resin layer 12 is about several to 30 times larger than the thickness t2 of the second resin layer. The thicknesses t1 and t2 herein refer to thicknesses at a position of a top of the protrusion 12B.

The thickness A of a portion of the second resin layer 13 at the recess 12C is slightly larger than the thickness B of a portion of the second resin layer 13 at the top of the protrusion 12B. More specifically, the size relationship thereof is 3/2A≥B.

Based on the thickness relationship of the resin layers 12 and 13 described above, in this embodiment, the thickness of the first resin layer 12 is set to 3 to 70 μm, while the thickness of the second resin layer 13 is set to 1 to 40 μm. More preferably, the thickness of the first resin layer 12 is 5 to 50 μm and the thickness of the second resin layer 13 is 3 to 10 μm.

In this embodiment, one sliding surface 3A of the swash plate 3 is formed as described above, and the other sliding surface 3B not shown in FIG. 2 is also formed in the same manner as the sliding surface 3A.

As described above, in the swash plate 3 of this embodiment, the surface of the substrate 11 is coated with the first resin layer 12, the annular groove 12A is formed across the entire surface of the first resin layer 12, and the surface of the first resin layer 12 is further coated with the second resin layer 13. Specifically, an intermediate layer conventionally provided between the substrate 11 and the resin layer is omitted in this embodiment.

Next, a production process of the swash plate 3 of this embodiment will be described. Specifically, in this embodiment, the disk-shaped substrate 11 made of an iron-based material is first prepared. Then, a thermosetting resin binder and at least one of graphite, carbon, $MoS_2$ and PTFE are mixed with a proper amount of organic solvent to prepare a resin paint for the first resin layer 12. The organic solvent adjusts the viscosity and facilitates mixing and any organic solvent may be used without limitation as long as it can dissolve a thermosetting resin binder. For example, when the thermosetting resin binder is polyamide-imide, xylene, N-methyl-2-pyrolidone, toluene, or the like may be used.

Then, the resin paint for the first resin layer is applied to flat opposite end surfaces of the substrate 11, and dried or/baked. As a painting method, for example, spray painting, roll painting, electrostatic painting or stamping painting may be used. Thus, the first resin layer 12 is formed to coat the opposite end surfaces of the substrate 11. Adding a hard material such as alumina besides the above-described additives can further increase the strength of the first resin layer 12.

Next, after the resin layer 12 on the opposite end surfaces is dried and/or baked, the annular groove 12A is formed across the enter surface of the first resin layer 12 in a circumferential direction at radially regular pitches. The annular groove 12A may be formed by cutting with a lathe or transferring a groove shape with a press or a roller.

Further, a resin paint for the second resin layer 13 separately prepared is applied to coat the entire surface of the first resin layer 12 formed with the annular groove 12A. The resin painting for the second resin layer 13 is a mixture of a thermosetting resin binder and at least one of low friction materials such as $MoS_2$ or PTFE with a proper amount of an organic solvent, and is applied to the entire surface of the first resin layer 12 formed with the annular groove 12A. Then, a through hole at the center of the substrate 11 is fitted on a drive shaft to rotate the substrate 11 at high speeds for a desired time. Thus, an excess of the resin paint for the second resin layer applied to the surface of the first resin layer 12 is thrown off by a centrifugal force and removed.

Then, the resin paint is again dried and/or baked. Thus, the second resin layer 13 in this embodiment is provided to have the above-described thickness so as to match the sectional shape of the surface of the first resin layer 12, and the above-described minute countless irregularities are formed in the entire surface of the second resin layer 13. As such, the swash plate 3 of this embodiment is produced.

The minute countless irregularities may be formed in the entire surface of the second resin layer 13 of the swash plate 3 of this embodiment for the following reasons. Specifically, in this embodiment, the mixture of the thermosetting resin binder to which $MoS_2$ or the like is added with the organic solvent is used as the resin paint for the second resin layer 13. Specifically, the resin paint for the second resin layer 13 in which countless particles of $MoS_2$ are evenly mixed in the liquid thermosetting resin binder is applied to the surface of the first resin layer 12. Then, when the substrate 11 is rotated, from the resin paint for the second resin layer 13, the thermosetting resin binder located on the side closest to the surface is thrown off by the centrifugal force, and also the surface side of the thermosetting resin binder coating each particle of $MoS_2$ is thrown off. Thus, the countless particles of $MoS_2$ mixed in the thermosetting resin binder are exposed on the surface, and the thermosetting resin binder is dried and baked in that state. Thus, it is supposed that countless particles of $MoS_2$ are exposed on the surface of the cured thermosetting resin binder and, thus, countless minute irregularities are formed across the entire surface of the second resin layer 13 in the embodiment.

The second resin layer 13 may be formed by the following method. Specifically, with the substrate 11 being rotated, the resin paint for the second resin layer is applied to the central side of the first resin layer 12 on the substrate 11. In this case, the substrate 11 is being rotated, and thus the paint applied to the central side of the opposite end surfaces of the substrate 11 is moved radially outwardly by the centrifugal force, and an unnecessary resin paint for the second resin layer is thrown off and removed. Thus, as the above-described embodiment, the second resin layer 13 can be formed to match the sectional shape of the surface of the first resin layer 12 across the entire surface.

Then, immediately after the finish of the production, as shown in FIG. 2, the entire surface of the sliding surface 3A (3B) of the swash plate 3 of this embodiment is coated with the second resin layer 13. Specifically, in the swash plate 3 of this embodiment, the resin layer 12 is not exposed to the surfaces of the sliding surfaces 3A and 3B in the state before sliding with respect to the shoes 4 (the state in FIG. 2). Thus, in an initial stage of sliding with respect to the shoe 4, the second resin layer 13 is the sliding surface 3A (3B) that slides with respect to the sliding surface 4A of the shoe 4.

Figures 3, 4:
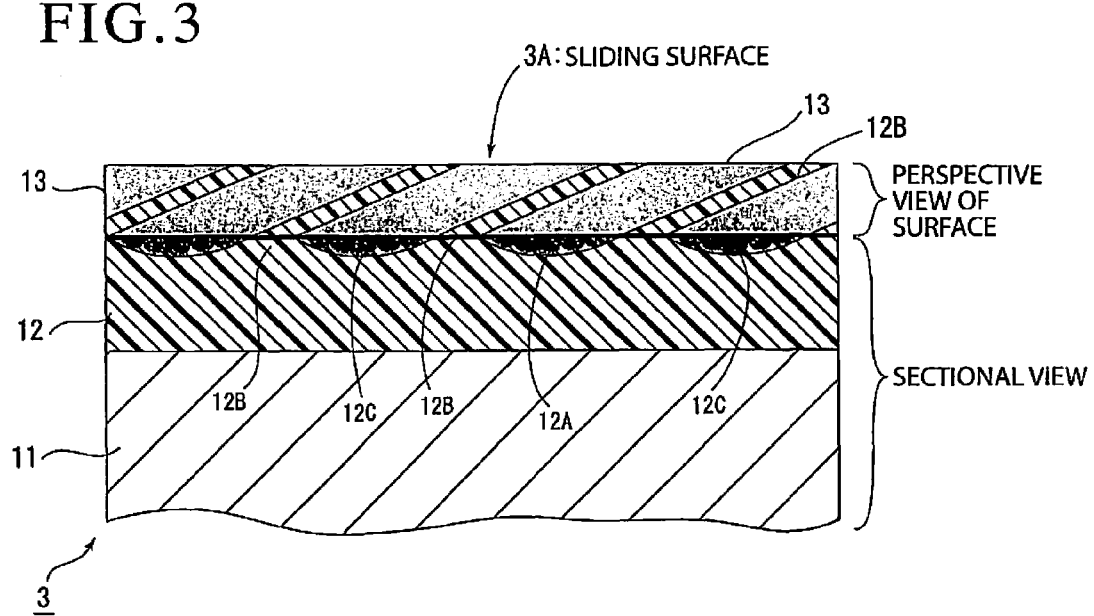
FIG. 3 is a sectional view of the portion shown in FIG. 2 partially worn and a perspective view of a surface shown together.
FIG. 4 shows a difference in sliding properties between the embodiment of the present invention and comparative members.

On the other hand, when time passes after the swash plate 3 is mounted to the rotating shaft 2 and then the sliding surfaces 3A and 3B slide with respect to the sliding surface 4A of the shoe 4, the second resin layer 13 coating the protrusion 12B and the top of the protrusion 12B wear (see FIG. 3). In this state, the top of the protrusion 12B of the first resin layer 12 and the second resin layer 13 adjacent thereto form the sliding surface 3A (3B) and slide with respect to the sliding surface 4A of the shoe 4.

According to the swash plate 3 of this embodiment, in the initial stage of sliding in which the sliding surfaces 3A and 3B start sliding with respect to the sliding surface 4A of the shoe 4, the second resin layer 13 of soft resin coating the top of the protrusion 12B wears to provide a good fit of the sliding surfaces 3A and 3B of the swash plate 3.

Then, as shown in FIG. 3, when the protrusion 12B of the first resin layer 12 and the second resin layer 13 adjacent thereto in the swash plate 3 wear due to sliding with respect to the shoe 4 and the protrusions 12B are exposed, the protrusions 12B and the remaining portion of the second resin layer 13 adjacent thereto as the sliding surfaces 3A and 3B slide with respect to the sliding surface 4A of the shoe 4.

In this state, the protrusions 12B of the first resin layer 12 of hard resin support the shoe 4 and, in this state, the second resin layer 13 of the soft resin also slides with respect to the sliding surface 4A of the shoe 4. Then, in this state, the lubricating oil is held in the countless minute irregularities in the surface of the second resin layer 13. This can maintain good seizure resistance and wear resistance of the sliding surfaces 3A and 3B in this embodiment.

FIG. 4 compares sliding properties between the swash plate 3 of this embodiment configured as described above and swash plates 3 of comparative members 1 to 4 with surfaces of substrates 11 being coated with different coating layers. More specifically, the sliding properties of wear resistance, seizure resistance, oil holding properties and low friction are compared between this embodiment and the comparative members 1 to 4 under the condition of very poor lubrication.

In FIG. 4, POOR refers to no effect, FAIR refers to poor effect, GOOD refers to good, VERY GOOD refers to very good. The test conditions were as described below.

Testing machine: High pressure atmosphere testing machine
RPM: 9500 rpm
Load: 16 MPa maximum
Type of oil: Mixture of refrigerating machine oil and coolant
Lubrication: Lubricant spraying
Counterpart shaft: SUJ2

As shown in FIG. 4, it is apparent that the swash plate 3 of this embodiment has good wear resistance, very good seizure resistance and oil holding properties, and low frictional resistance.

Unlike this embodiment, in the comparative member 1, the surface of the substrate 11 was coated with a flat metal coating (Cu alloy spray layer) with an even thickness. For the comparative member 1, there were poor oil-holding properties and no effect of other sliding properties. Particularly, evaluation of wear resistance was impossible due to seizure.

In the comparative member 2, the surface of the substrate 11 was coated with a PTFE resin with an even thickness and the same annular groove as in this embodiment is provided in the surface. For the comparative member 2, the wear resistance was good but other sliding properties were poor or not effective.

In the comparative member 3, the surface of the substrate 11 was coated with $MoS_2$ resin with an even thickness. For the comparative member 3, the sliding properties other than wear resistance were good but the wear resistance was not effective. In the comparative member 4, the surface of the substrate 11 is covered with a mixed resin of PTFE resin and $MoS_2$ resin with an even thickness. For the comparative member 4, the sliding properties were generally poor.

As shown in FIG. 4, it is apparent that the swash plate 3 of this embodiment is superior in all the sliding properties.

As described above, the swash plate 3 of this embodiment has superior sliding properties for the following reasons. Specifically, in the surfaces of the sliding surfaces 3A and 3B of the swash plate 3, the annular groove 14 is generally maintained to match the annular groove 12A in the first resin layer 12 and minute countless irregularities are formed in the entire surface of the second resin layer 13. Thus, the lubricating oil can be easily held in the sliding surfaces 3A and 3B to form an oil film. Thus, the oil film can be easily formed on the sliding surfaces 3A and 3B and it is supposed that the swash plate 3 of this embodiment has good oil-holding properties.

Also, in the initial stage of sliding in which the sliding surfaces 3A and 3B of the swash plate 3 start sliding with respect to the sliding surfaces 4A and 4B of the shoe 4, the portion of the second resin layer 13 of the soft resin at the protrusion 12B wears, and thus the swash plate 3 of this embodiment has a good fit to the sliding surface 4A of the shoe 4.

Further, as shown in FIG. 3, when the second resin layer 13 coating the tops of the protrusions 12B wears and the protrusions 12B of the first resin layer 12 are exposed, the protrusions 12B of the hard resin slide with respect to the sliding surface 4A of the shoe 4 to prevent wear of the second resin layer 13. Also, it is supposed that the wearing powdery second resin layer 13 adheres to the exposed protrusions 12B to improve the wear resistance of the swash plate 3.

Also in the state shown in FIG. 3, there is the second resin layer 13 adjacent to the exposed protrusions 12B of the exposed first resin layer 12 and thus the lubricating oil is held in the second resin layer 13. Thus, it is supposed that the swash plate 3 of this embodiment also has a good seizure resistance.

As described above, according to the swash plate 3 and the production method thereof of this embodiment, the swash plate 3 having a high wear resistance and seizure resistance can be provided, even in a poor lubrication state where the lubricating oil is insufficiently supplied.

Also, according to this embodiment, a swash plate can be provided which is suitable as a swash plate 3 for a swash plate type compressor used in a severe environment with a new coolant or a $CO_2$ coolant.

Further, in the conventional swash plate, the relatively expensive intermediate layer, such as a metal layer, a plated layer or a chemical conversion coating layer, is provided on the surface of the substrate 11 but such an intermediate layer is omitted in this embodiment. Thus, according to this embodiment, one step of the production process of the swash plate 3 can be omitted, which can reduce the production costs of the swash plate 3.

Multiple concentric annular grooves may be formed instead of the spiral annular groove 12A provided in the surface of the first resin layer 12. With such a configuration, the same operation and effect as the above-described embodiment can be obtained.

In the embodiment, the iron-based substrate 11 is used but an aluminum- or copper-based substrate 11 may also be used.

REFERENCE SIGNS LIST

3 . . . swash plate
3A, 3B . . . sliding surface

4 . . . shoe
11 . . . substrate
12 . . . first resin layer
12A . . . annular groove
13 . . . second resin layer

What is claimed is:

1. A method of producing a swash plate (3) having a sliding surface (3B) that slides with respect to a shoe (4), comprising the steps of:
   providing a substrate (11) comprising an iron-, aluminum- or copper-based material;
   applying a first resin paint composed of hard resin to an end surface of the substrate to form a first resin layer (12);
   drying or baking the first resin layer (12) and then forming a minute annular groove (12A) in a surface of the first resin layer (12);
   applying a second resin paint composed of soft resin to the first resin layer (12) provided with the annular groove (12A);
   rotating the substrate (11) at a high speed to remove unnecessary parts of the resin paint for a second resin layer (13); and
   shaping the second resin layer (13) to match a sectional shape of the surface of the first resin layer (12).

2. The method according to claim 1, wherein a thickness of a protrusion (12B) of the annular groove (12A) in the first resin layer (12) is larger than a thickness of the second resin layer (13).

3. The method according to claim 2, wherein a thickness B of the second resin layer (13) covering the protrusion (12B) of the annular groove (12A) in the first resin layer (12) and a thickness A of a portion of the second resin layer (13) coating a recess (12C) of the annular groove (12A) have a size relationship of $3/2A \geq B$.

4. The method according to claim 3, wherein the first resin layer (12) is a thermosetting resin binder to which at least one of graphite, carbon, $MoS_2$ and PTFE is added, and
   the second resin layer (13) is a thermosetting resin binder to which at least one of $MoS_2$ and PTFE is added.

5. The method according to claim 1, wherein the first resin layer (12) has a thickness of 3-70 μm and the second resin layer (13) has a thickness of 1-40 μm.

6. The method according to claim 5, wherein the first resin layer (12) has a thickness of 5-50 μm and the second resin layer (13) has a thickness of 3-10 μm.

* * * * *